No. 699,244. Patented May 6, 1902.
W. RUBIN.
MACHINE FOR TESTING CANS.
(Application filed Oct. 5, 1901.)
(No Model.) 4 Sheets—Sheet 1.
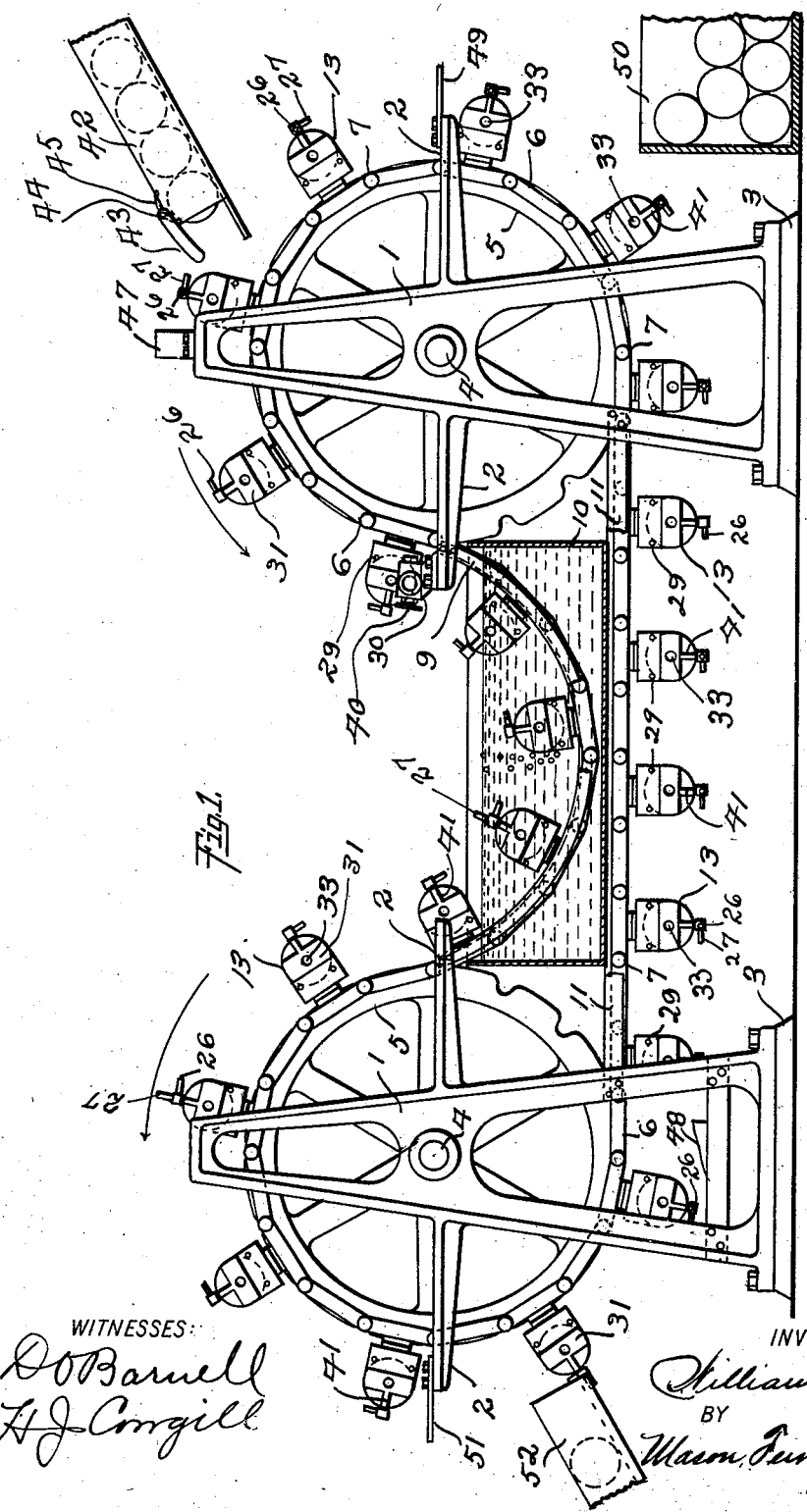

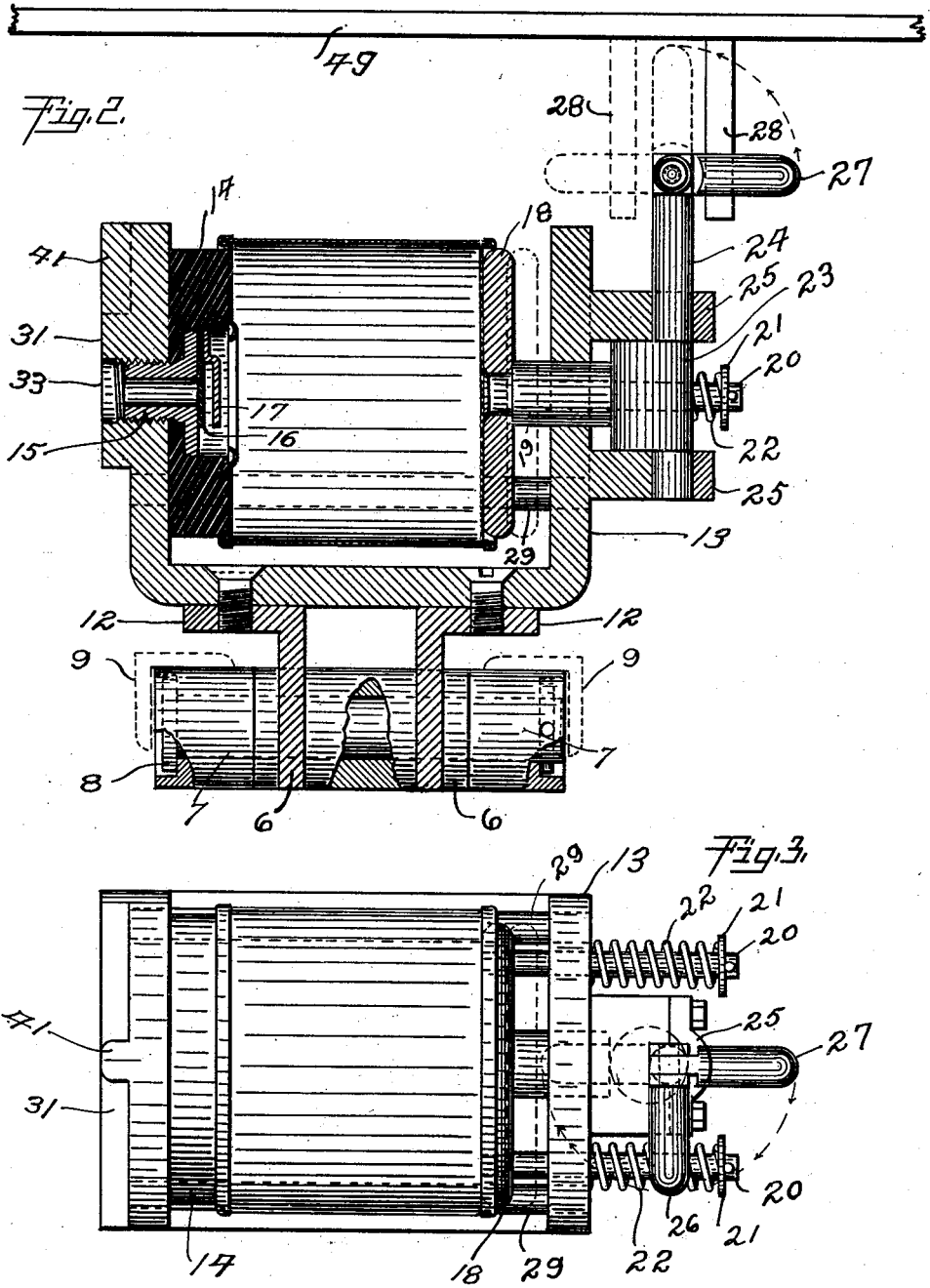

No. 699,244. Patented May 6, 1902.
W. RUBIN.
MACHINE FOR TESTING CANS.
(Application filed Oct. 5, 1901.)
(No Model.) 4 Sheets—Sheet 3.
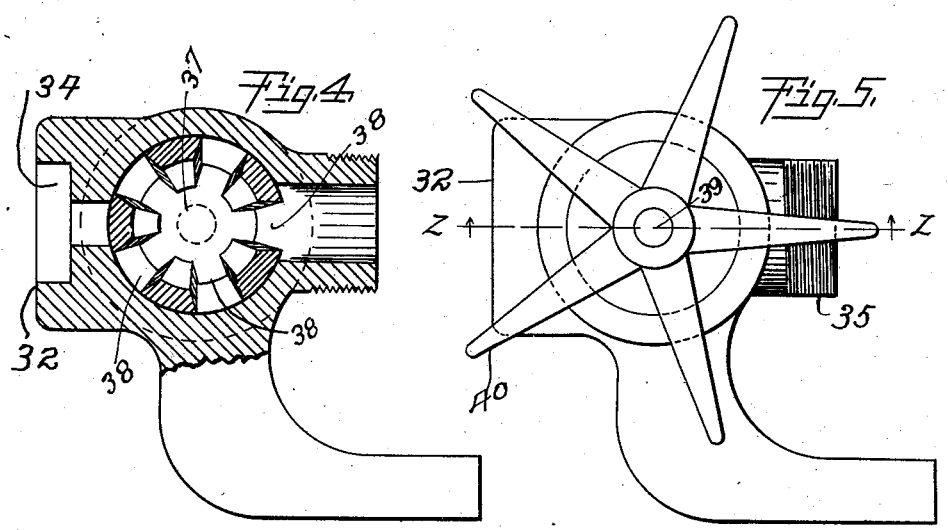
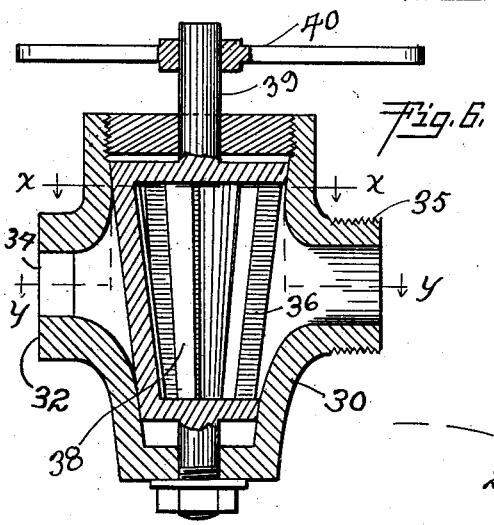
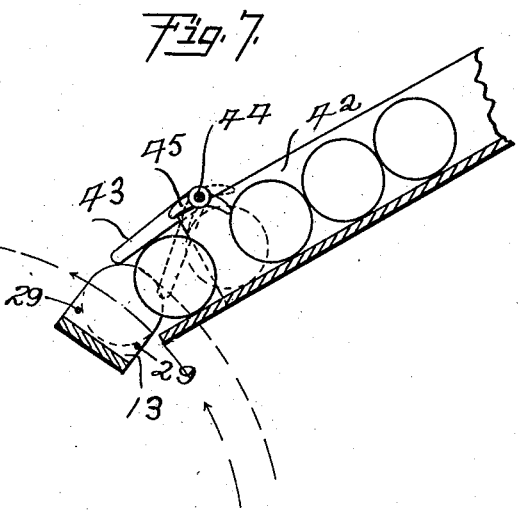
WITNESSES:
D. O. Barnell
H. J. Cargill
INVENTOR
William Rubin
BY
Mason, Fenwick & Lawrence
ATTORNEYS No. 699,244. Patented May 6, 1902.
W. RUBIN.
MACHINE FOR TESTING CANS.
(Application filed Oct. 5, 1901.)
(No Model.) 4 Sheets—Sheet 4.
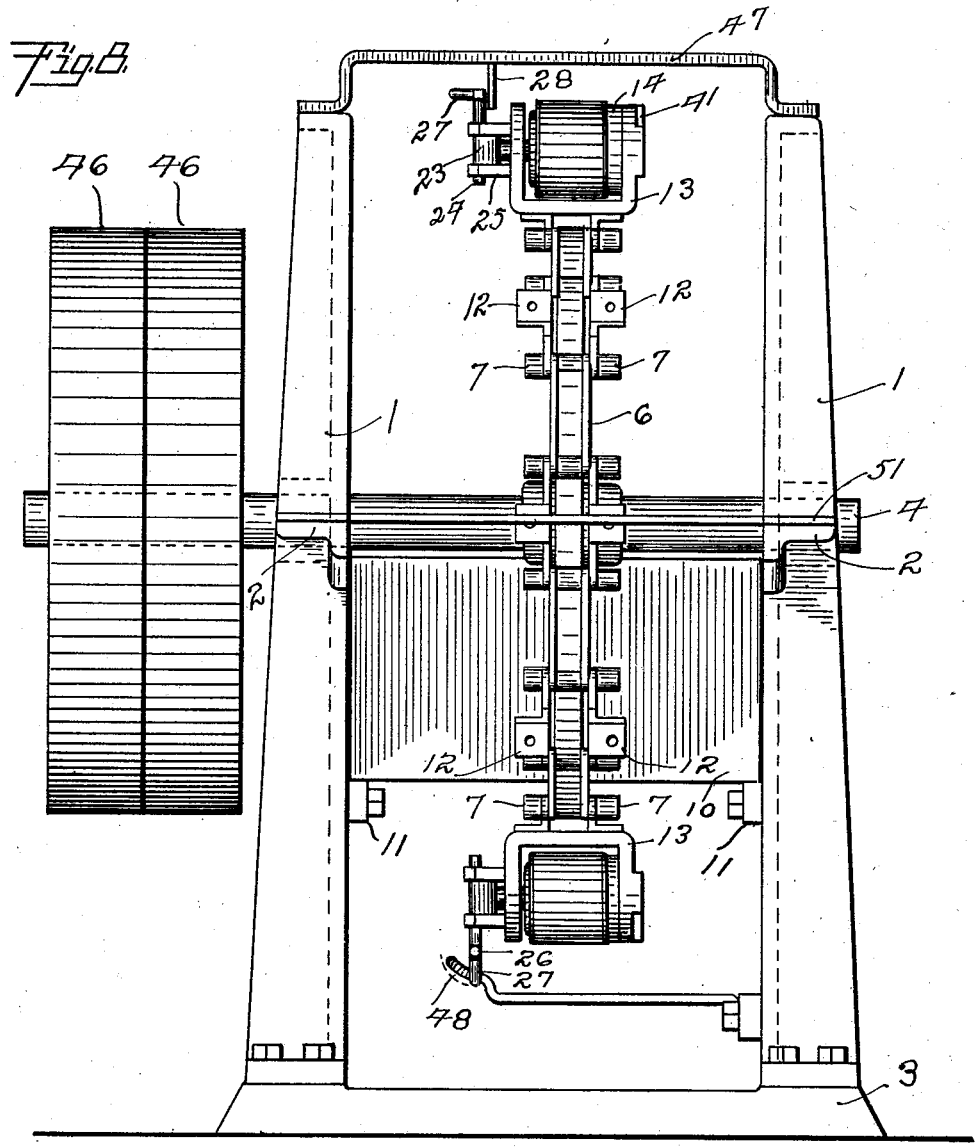
WITNESSES:
INVENTOR
William Rubin
BY
Mason, Fenwick Lawrence
ATTORNEYS

UNITED STATES PATENT OFFICE.

WILLIAM RUBIN, OF SOUTH OMAHA, NEBRASKA.

MACHINE FOR TESTING CANS.

SPECIFICATION forming part of Letters Patent No. 699,244, dated May 6, 1902.

Application filed October 5, 1901. Serial No. 77,698. (No model.)

*To all whom it may concern:*

Be it known that I, WILLIAM RUBIN, a citizen of the United States, residing at South Omaha, in the county of Douglas and State of Nebraska, have invented certain new and useful Improvements in Machines for Testing Cans; and I do hereby declare the following to be a full, clear, and exact description of the invention, such as will enable others skilled in the art to which it appertains to make and use the same.

The present invention relates to improvements in machines for testing metallic closures, such as tin or other sheet-metal cans, to determine whether they will leak at any point before being put into use.

It consists in a machine provided with a series of can-holders, means for charging the cans with compressed air and passing them through water or other suitable liquid, whereby if the air leaks from the can bubbles escaping therefrom will readily attract the attention of the attendant, and the leaky can will be found at once.

It further consists in a machine having an endless conveyer provided with holders for receiving cans and means for passing the cans past an air-charging device and thence through a liquid for discovering whether the cans leak at any point, after which the cans are discharged from the machine.

It also consists in a machine provided with means for charging cans with compressed air and then passing them through a liquid to ascertain whether the air leaks therefrom, means for discharging the cans from the machine, and means for automatically separating the leaky cans from the good ones in discharging the said cans from the machine.

It further consists in certain other novel constructions, combinations, and arrangements of parts, as will be hereinafter fully described and claimed.

In the accompanying drawings, Figure 1 is a side elevation of a machine constructed in accordance with the present invention, a portion of the same being broken away and shown in section to more clearly reveal this construction. Fig. 2 is a central section through one of the can-holders of the machine and the chain to which it is attached. Fig. 3 is a top plan view of one of the can-holders. Fig. 4 is a detail sectional view through the air-valve employed, taken on the broken line $x\,x\,y\,y$ of Fig. 6. Fig. 5 is an end elevation of the said valve. Fig. 6 is a longitudinal section through the valve on the line $z\,z$ of Fig. 5. Fig. 7 is a detail sectional view through the feed-chute, showing an escapement for regulating the discharge of cans therefrom. Fig. 8 is an end elevation of the can-testing machine.

The object of the invention is the providing of a mechanism by which metallic receptacles, particularly tin or sheet-metal cans may be taken by an endless carrier or conveyer and passed continuously one after the other by an air-charging device and thence be passed through a receptacle or chamber containing liquid, so that if there is a leak in the can the compressed air will divulge the same by coming to the surface of the liquid over the can in the form of bubbles.

It is also the object of the invention to provide such machine with means for indicating and separating the leaky cans from the good ones and automatically discharging the same at different points, so that the good cans will be separated from the leaky ones.

In developing the invention in a practical manner I employ standards 1 1, having laterally-projecting arms 2 for supporting the various portions of the mechanism, as will be hereinafter fully described. The standards 1 are secured to suitable bases 3 and are provided with journal-bearings for receiving and revolubly supporting shafts 4. The shafts 4 extend between the oppositely-arranged standards 1, as clearly seen in Fig. 8 of the drawings, and carry sprocket-wheels 5, over which an endless carrier-chain 6 travels, as clearly illustrated in Fig. 1 of the drawings. The chain 6 is preferably of the link type and at its joints is formed with laterally-projecting rollers 7, the rollers being secured in position by the pivot-pins 8 of the chain, which project a suitable distance on either side thereof for this purpose. The pivot-pins 8 are headed at their ends, as illustrated in Fig. 2, so that the rollers are limited in endwise movement upon said pins. The rollers are preferably formed so as to project beyond the headed ends of the pins, as seen in said Fig. 2, so that when the rollers engage a guiding-track in the machine they will constitute complete antifriction means for guiding the chain.

The machine is formed with a tank 10 of suitable size, supported between the standards 1 1 by means of longitudinal bars 11, which are rigidly fastened to said standards and are arranged so as to hold the said tank between the sprocket-wheels 5 5. Descending into the tank 10 are a pair of curved angle-iron bars 9 9, forming a dipping-track, which engages the rollers 7 of the carrier-chain 6, as will be readily understood by reference to Figs. 1 and 2. The chain 6 passes below the sprocket-wheels 5, preferably in a straight line from one to the other, and thence around one of the sprocket-wheels and is depressed between the sprocket-wheels by the said track 9, so that can-holders secured to said chain will be submerged in water or other liquid placed in the tank 10, after which the chain will pass upwardly out of the tank and over the other sprocket-wheel 5. At suitable intervals along the chain certain of the links are provided with projecting lugs 12 12, to which are secured can-holders 13. These can-holders are preferably U-shaped in vertical cross-section, as shown in Fig. 2, and are adapted to receive cans or sheet-metal receptacles to be tested. The U-shaped holder 13 is fastened by screws, rivets, or other suitable means to the laterally-projecting portions of the lugs 12 12. One of the upright projecting ends of each holder is formed on its inner surface with a disk or pad 14 of some resilient material, preferably rubber. The rubber pad 14 is provided with a central countersunk aperture adapted to receive a hollow nipple 15, which screws into an upright of a holder and clamps the said pad securely thereto. The nipple 15 is provided with an inwardly-opening flap or trap valve 16, the movement of which is limited by a stop 17, also secured to said nipple. The standard of the holder is preferably thickened at the point where it engages the nipple 15, the said thickened standard portion being formed with an aperture 33, extending through the same from side to side. The said thickened portion of the standard is also formed with a laterally-projecting vertical rib or lug 41 for engaging and controlling an air-valve, as will be hereinafter fully described. On the other side of the holder the upright is arranged to carry a movable disk 18, which is provided with a centrally-located stem 19 and outer smaller stems 20, arranged diametrically opposite to each other, passing through the upright of the holder 13 and projecting a sufficient distance beyond the same to receive coiled springs 22. The springs 22 are interposed between washers 21 on the outer ends of said stems 20 and the outer faces of the standards on the holders 13, so that the movable disk 18 will be normally drawn toward the inner face of the said holder-standard. The action of these springs 22 forces under a yielding pressure the central stem 19 of the disk 18 against a cam 23, which is carried by a shaft 24. The shaft 24 is journaled in laterally-extending lugs or brackets 25, projecting from the standard of the holder 13. One end of the shaft 24 projects beyond its journal-bearing and carries a pair of arms 26 and 27, which normally project laterally from said shaft and are arranged to strike certain projections or pins 28 28, which are secured to the frame of the machine at suitable points. The disk 18 is arranged directly opposite the pad or disk 14 and is adapted to force a can which is inserted between the disks against the said pad 14. When the arm 27 is struck by a pin or projection 28, the cam 23 is rotated, so as to force the disk 18 against the end of a can and clamp it snugly against the resilient pad 14. The can will be held tightly in this position until the arm 27 engages another pin or projection 28, so as to rotate the cam again and permit the springs 22 to retract the disk 18 and release the can. When the arm 27 is engaged by a pin 28, it will be moved so as to turn the shaft 24 approximately one-fourth of a revolution. The arm 27 is preferably hinged to the end of the shaft 24, being pivoted in the bifurcated portion thereof, so that it may be brought into vertical position, as shown in dotted lines in Fig. 2, having its axis in coincidence with the axis of the shaft 24. This manipulation of the arm 27 is useful in discriminating between leaky and good cans, as will be hereinafter clearly shown. Across the lower portion of each holder 13 are placed a pair of rods 29, which extend from one standard of the holder to the other and are so arranged as to support a can in proper position for clamping between the disks 14 and 18.

Upon one of the projecting arms 2 of one of the standards and adjacent to the water-tank is secured an air-valve 30 of suitable construction. This valve is so placed that when the can-holders pass the same the smooth outer surface 31 of the thickened standards thereof will rub against the surface 32 of the valve-casing, forming a practically air-tight joint between the parts, and momentarily bring the opening 33 of each can-holder opposite an opening 34 in the said air-valve. The air-valve is well illustrated in Figs. 4, 5, and 6 of the drawings, as well as the means for turning the same. The valve-casing is connected with any convenient source for obtaining compressed air, the air entering through a hollow nipple 35, formed in the valve-casing. Within the valve-casing is arranged a plug 36, which is preferably tapered, as shown, whereby any wear may be taken up. The plug 36 is cored out centrally, so as to be hollow, as at 37, and is formed with lateral radially-extending openings or ports 38, leading into the said hollow portion of the plug. The ports are so arranged that one of the tapering solid portions of the plug 36 between the said ports will close the opening 34, leading from the valve-casing, while at the same time one of the ports 38 will be opposite the opening of the nipple 35 to receive compressed air. The stem 39 of the plug 36 carries a star-wheel 40, having a number of radially-extending points or arms, the number of the arms corresponding with the number of the openings or ports 38 of the plug. When a can-holder passes the valve, one of the arms of the star-wheel 40 will be engaged by the lug or rib 41 of said holder, and the valve-stem, together with the plug or valve, will be rotated a distance equal to the distance between the arms or points of the star-wheel 40. This will operate to permit air to pass through the opening 34 and the nipple 35 of the can-holder, past the valve 16, and into the can. The valve will be left by the holder in a position to close the outlet-passage 34 and prevent the escape of air until the next holder approaches the valve-casing. The compressed air having once been introduced into the can is held there by the valve 16 and can only escape through any leaking portion of the can, if there be such. After the cans are thus charged with air they pass from the valve down into the tank 10, and if a can is leaky the air will force itself out into the liquid in said tank and, rising to the surface thereof, will indicate such a leak to the eye of the attendant or operator of the machine.

The cans may be supplied to the holders by any suitable means; but I preferably employ a chute 42, placed at one end of the machine in suitable relation to the carrier-chain as it passes over the sprocket-wheel 5. In order to render the feed of the cans automatic, I provide the chute with an escapement for causing the delivery of the cans one at a time. The said escapement is formed with an arm or pallet 43, secured to a short shaft 44, the said shaft 44 carrying a semilune or double pawl 45. The escapement is so arranged at the end of the chute that when a can-holder passes the same the said holder will raise the arm 43 and turn the semilune or double pawl 45 so that one end thereof is raised sufficiently to permit a can to escape from the chute and roll into the holder, as indicated in Fig. 7, while the opposite end of pawl 45 is thrown downwardly into the path of the remaining cans in the chute so as to prevent them escaping therefrom. By this mechanism it is merely necessary to keep the chute supplied with cans, as the escapement will automatically deliver them one at a time to the can-holders as they pass the chute.

With the construction above set forth the operation will be readily apparent. The cans to be tested are placed in the chute 42 and power is applied through suitable belting to pulleys 46 upon the shaft 4 of one of the sprocket-wheels 5 for driving the endless carrier-chain 6, to which the can-holders are secured. The can-holders will thus be moved continuously through the machine in the direction of the arrows in Fig. 1. As each can-holder passes the end of the chute 42 a can is permitted to drop into the same upon the supporting-rods 29 thereof and so that the open end of the can is adjacent to the resilient pad 14, while the closed end thereof is opposite the disk 18. Each can-holder passes beneath the cross-bar 47, connecting two of the standards of the machine, and a pin 28, depending therefrom, will engage the arm 26 of the shaft 24 and rotate the said shaft and cam 23, carried thereby, so as to force the disk 18 against the end of the can and press the open end of the can firmly against the rubber pad or disk 14. Continuing, the carrier passes the can along opposite the aperture within the valve-casing of the air-valve, the star-wheel 40 at the same time engaging the rib or lug 41 and admitting a charge of air to the can. As the can-holder passes the valve the charge of air within the can will be entrapped therein by means of the flap-valve 16. The can-holder then passes through the water in the tank 10, and if the can is a defective one bubbles of air will indicate the fact, and the attendant, observing the same, will raise the pivoted arm 27 of the cam-shaft 24 to the vertical position shown in dotted lines in Fig. 2. If no bubbles appear, the can will be found to be air-tight and the position of arm 27 will not be altered. As the carrier travels on through the machine the can-holders will pass around the second sprocket-wheel and the arms 27 of the holders containing perfect cans will engage the projections 28 on the support 51, so as to turn the cam 23 and release the can just above the end of a chute 52. The good cans will thus be delivered in the chute 52 and taken from the machine at one point. In the case of the defective cans, however, each holder thereof having had its arm 27 turned out of its normal position will pass the projection 28 above the chute 52 without being actuated thereby and the holder will continue to carry the can along through the machine to the other end thereof. As the holder passes beneath the second sprocket-wheel 5, however, the arm 27, which has been straightened, will be engaged by a projecting cam-surface 48, secured to one of the standards 1, and clearly illustrated in Figs. 1 and 8 of the drawings, by which the said arm 27 will be again returned to its normal horizontal position. When each holder carrying a defective can reaches the front end of the machine again, the arm 27, which has been returned to its normal position, will be engaged by the pin 28 on a bar 49, which is secured to arm 2 of one of the standards 1 and will cause the turning of the can 23, so as to discharge the can into a suitable receptacle 50, arranged beneath the bar 49. The holder will thus be freed of its can and be ready to receive a new one when passing beneath the chute 42 again. By this simple arrangement of the parts the leaky cans can be readily indicated and the good cans will be automatically assorted from the leaky ones, only one operator being required, whose duty is the control of the assorting mechanism.

A machine of this character can be used for testing a great many cans in a short space of time, and such testing-machine can, if desired, be arranged to receive cans directly from the machine for manufacturing the cans or for soldering heads and bottoms upon the same.

Having thus fully described my invention, what I claim as new, and desire to secure by Letters Patent, is—

1. In a can-testing machine, the combination with a suitable frame, of an endless conveyer-chain, sprocket-wheels carrying the same, can-holders secured to the chain at suitable intervals and each provided with can-clamping means, clamp-operating means carried thereby, a tank for containing a testing liquid, a track descending into said tank, means on said chain engaging said track for guiding the chain and its can-holders into the tank, whereby the can carried will be immersed in the testing liquid, means for operating said clamp-operating means for tightening the clamp, means on said frame for operating said clamp-operating means when in one position for releasing the same at one point in the machine, and means on the frame for operating said clamp-operating means when in another position at another point in the machine, substantially as described.

2. In a mechanism of the class described, the combination with a suitable frame, of endless carrying means supported thereon, can-holders provided with clamping means attached to said endless carrier, clamp-operating means carried thereby, means for automatically releasing said clamping means at one point in the machine, when the clamp-operating means is in one position, and means for automatically releasing said clamp-operating means at a different point in the machine when the clamping means is in another position, substantially as described.

3. A can-testing machine, comprising a carrier-chain, can-holders applied thereto at suitable intervals, each comprising a frame portion having a yielding pad on one side and a movable disk on the other side for clamping a can in position, a cam for operating the movable disk, an arm carried by said cam and adjustable thereon and means arranged at various points in the machine designed to actuate said arm according to its position for operating said cam at any one of said points, substantially as described.

4. A can-testing machine, comprising a conveyer-chain, can-holders secured thereto, comprising U-shaped frames, a central perforated elastic disk on one upright of said holder for receiving the open end of the can, a shaft on the other standard of the holder, a movable disk carried by the shaft for pressing the can against the elastic disk, a cam engaging the end of said shaft for forcing the movable disk against the can, means carried by the cam for being operated to effect the release of the disk again when the can is to be discharged, and means for admitting compressed air to the cans while in the holders and retaining it therein, substantially as described.

5. A can-testing machine, comprising a traveling conveyer, a series of can-holders applied thereto, each holder having a standard, a yielding disk, and a movable disk for clamping a can therein, the said movable disk being provided with an operating-stem, guide-stems also carried by the said movable disk, springs for engaging the said stems for normally holding the disk in its outer position, a cam for engaging the operating-stem of the disk, a shaft carrying said cam, and arms on the shaft adapted to engage projections arranged in the machine, whereby the movable disk will be operated to clamp or release a can, substantially as described.

6. A can-testing machine made up of suitable supporting-standards, sprocket-wheels mounted therein, a carrier-chain passing over said sprocket-wheels, can-holders secured to the carrier-chain, a cam mechanism on each carrier for clamping cans in the holders, a shaft for operating said cam mechanism, a laterally-projecting arm rigidly secured to said shaft, and a pivoted arm also secured to said shaft and normally occupying a lateral position with respect to the same, a projection upon the machine-frame for engaging the fixed arm to actuate the cam mechanism for clamping a can in the holder, a projection for engaging the pivoted arm for releasing said holder, the said pivoted arm also affording means whereby the imperfect can may be discharged at a different point in the machine from the good cans, substantially as described.

7. A can-testing machine, comprising a suitable frame, a traveling conveyer-chain moving therein carrying can-holders, a cam mechanism on each holder for clamping the cans therein, a shaft for operating the said cam, said shaft being provided with a fixed and a pivoted arm normally extending laterally therefrom, a projection on the frame for engaging the fixed arm to clamp the cans in the holders, a projection for engaging the pivoted arm, for releasing the cans from the holders when they are perfect, the said pivoted arm affording means for marking imperfect cans by turning the same so as to coincide with the longitudinal axis of the cam-shaft, a cam track or lug upon the machine for turning the pivoted arm to its laterally-projecting position, and a second projection on the frame for engaging the said pivoted arm, the structure being such that the imperfect cans will thus be discharged from the machine at a different place from the point where the good cans are discharged, substantially as described.

8. A can-testing machine, comprising a series of can-holders, means for delivering compressed air to the cans when in said holders, comprising a valve mechanism, a plug in said valve mechanism, a star-wheel for operating said plug, and a projection on each can-holder for engaging the star-wheel and turning the same so as to open the valve and close the same again after air has been admitted to the can as the can-holder passes the valve mechanism.

9. A can-testing machine, comprising a series of can-holders, a valve mechanism adapted to be brought in coincidence with said holders, comprising a valve-casing, a plug or valve mounted within the same and provided with a series of lateral ports, a stem for turning the valve or plug, arms projecting from said stem for actuating the same, the said arms projecting into the path of a rib or lug on the can-holder so that as the can-holder is moved past the valve, the said rib or lug will turn the plug or valve so as to admit compressed air from any suitable source into the can to be tested, the said plug being turned so as to shut off the supply of compressed air when the can-holder is moved away from the valve mechanism, substantially as described.

10. A can-testing machine, comprising a series of can-holders, and a valve mechanism, means for moving the can-holders past the valve mechanism but in very close relation thereto, a valve-plug within the valve-casing formed with a series of ports leading into the hollow interior of said valve or plug, the portions of the plug between said ports being so arranged that one of them will normally occupy a position to close the outlet-port of the valve-chamber, and means for turning the plug as each holder passes the valve-casing, whereby compressed air will be admitted to the can in the holder, substantially as described.

In testimony whereof I hereunto affix my signature in presence of two witnesses.

WILLIAM RUBIN.

Witnesses:
D. O. BARNELL,
H. M. CHRISTIE.